United States Patent [19]

Hawk

[11] 4,077,649
[45] Mar. 7, 1978

[54] ARTICULATED VEHICLE HITCH

[75] Inventor: Dale Wyatt Hawk, Springfield, Ill.

[73] Assignee: Fiat-Allis Construction Machinery, Inc., Deerfield, Ill.

[21] Appl. No.: 745,104

[22] Filed: Nov. 26, 1976

[51] Int. Cl.² .............................................. B60D 7/04
[52] U.S. Cl. .................................................... 280/420
[58] Field of Search ........................ 280/420, 421, 422

[56] References Cited

U.S. PATENT DOCUMENTS

| | | | |
|---|---|---|---|
| 2,603,531 | 7/1952 | Gustafson | 280/421 |
| 2,888,275 | 5/1959 | Hill | 280/420 |
| 3,134,628 | 5/1964 | Lackey | 280/421 |
| 3,181,888 | 5/1965 | Boylan | 280/421 |

Primary Examiner—Joseph F. Peters, Jr.
Assistant Examiner—R. Schrecengost
Attorney, Agent, or Firm—August E. Roehrig, Jr.; Robert A. Brown; Harvey W. Rockwell

[57] ABSTRACT

A vertical coupling or hitch shaft carried by one of a pair of articulated units in engagement with a complementary shaft-receiving bearing surface carried by another unit for joining the articulated vehicle is formed with an aperture through which flexible control lines are passed to interconnect controls positioned on the draft unit with operable actuators on the trailer unit to actuate the controlled functions.

6 Claims, 3 Drawing Figures

ARTICULATED VEHICLE HITCH

BACKGROUND OF THE INVENTION

This invention relates in general to a hitch construction for articulated motor vehicles and, in particular, to an articulated motor vehicle hitch for pivotally connected draft and trailer units.

More specifically this invention relates to a hitch connection for joining draft and trailer units of an articulated motor vehicle wherein the two units are interconnected for functional control by means of cables or hydraulic lines.

Articulated motor vehicles are generally large vehicles which necessitate relative pivotal movement between the articulated units. Such vehicles are used, for example, as construction machinery equipment for transporting and discharging earth and similar materials, and utilize a so-called "fifth wheel" connection between the draft and supported trailer units. This fifth wheel connection couples the trailer to the draft or tractive unit so that it may be pulled thereby, and also provides for steering of the vehicle by turning the draft unit with respect to the trailer.

The draft or tractive unit and the supported trailer are also interconnected by cables and/or hydraulic lines so that a machine operator on the draft unit can control functions of the trailer unit through operation of controls situated within the vehicle cab to operate actuators on the trailer. Heretofore such interconnecting controls between the units have been positioned together and extended from the draft unit to the trailer unit over the vertical coupling shaft of the fifth wheel connecting between the units. The routing of such control lines in this manner presents a potential safety hazard in that the control lines are exposed during operation of the machine and may become severed or damaged during machine operation. In addition, routing of the control lines in this manner adds to the height of the machine impairing operator visability and presents an objectionable appearance.

One attempt to eliminate certain of the problems associated with the coupling of the control lines between the draft and trailer units is disclosed in P. F. McAdams, U.S. Pat. No. 3,032,135, "POWER STEERING MECHANISM". This prior art discloses a vehicle hitch for articulated vehicles wherein the vertical pivot connection or vertical hitch shaft has been replaced by two co-axially spaced pivot connections joining the draft unit to the draft frame of the trailer. While such a construction of a vehicle hitch eliminates some of the problems heretofore associated with coupling the interconnected control cables and/or hydraulic lines between the draft and trailer units, such a structure is complicated and may be susceptible to damage in the field. In addition, due to the operation of these vehicles at high speeds over uneven terrain, difficulties have been encountered in providing suitable hitch constructions that can withstand the severe stresses imposed for protracted periods.

SUMMARY OF THE INVENTION

It is, therefore, an object of this invention to improve articulated motor vehicle hitch connections.

Another object of this invention is to lower articulated motor vehicle height and improve operational safety by lowering the vertical position of the control lines interconnecting the articulated units.

A further object of this invention is to protect the interconnecting control lines between the draft and trailer unit of an articulated motor vehicle from damage and wear.

These and other objects are attained in accordance with the present invention wherein a vertical coupling or hitch shaft carried by one of a pair of articulated units in engagement with a complementary shaft-receiving bearing surface carried by another unit for joining the articulated vehicle is formed with an aperture through which flexible control lines are passed to interconnect controls positioned on the draft unit with operable actuators on the trailer unit to actuate the controlled functions.

DESCRIPTION OF THE DRAWINGS

Further objects of the invention together with additional features contributing thereto and advantages accruing therefrom, will be apparent from the following description of one embodiment of the invention when read in conjunction with the accompanying drawings.

DESCRIPTION OF A PREFERRED EMBODIMENT

Figure 1:
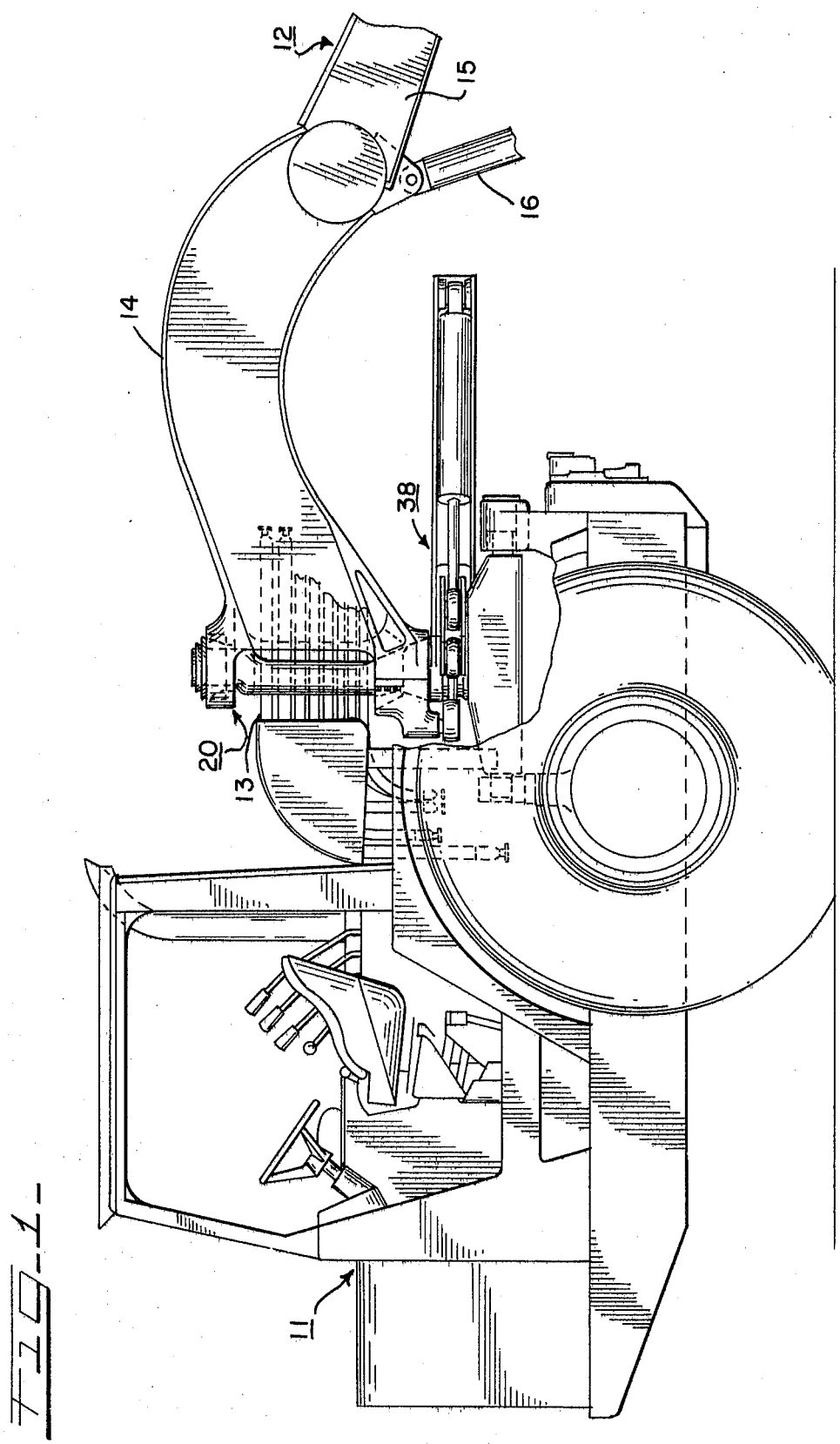
FIG. 1 is a side profile view of a portion of an articulated vehicle having a coupling utilizing the present invention.
Figure 2:
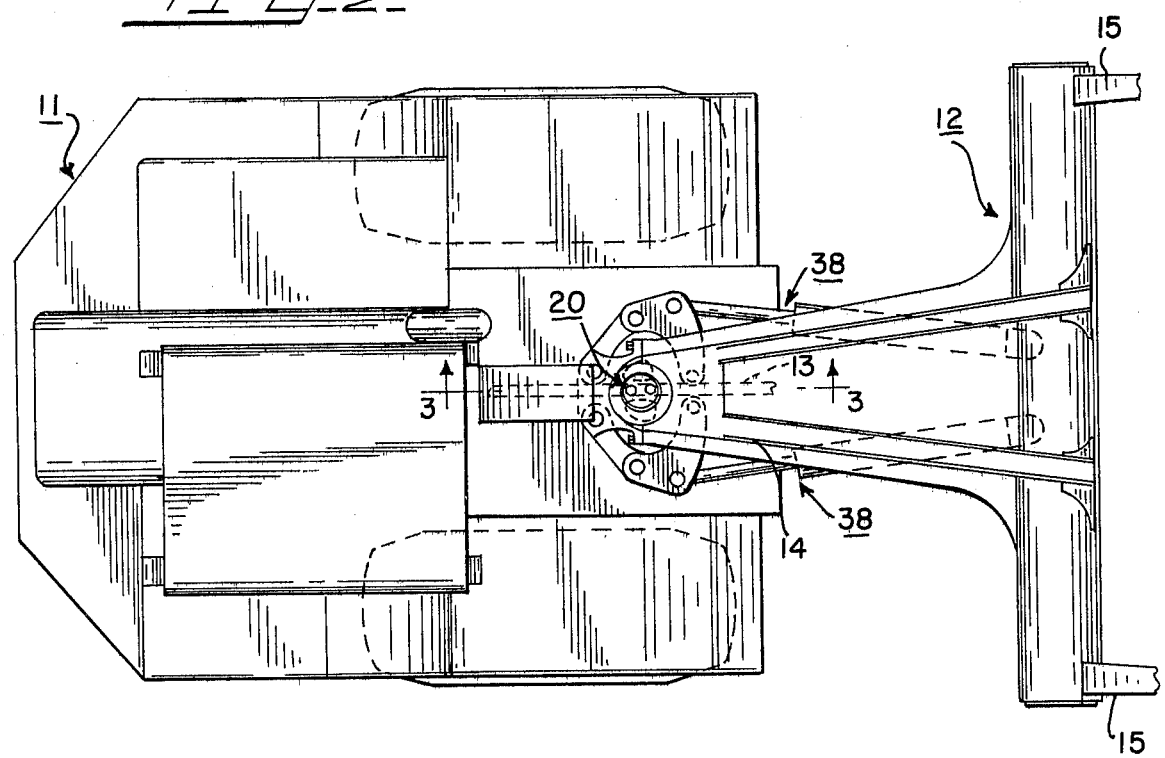
FIG. 2 is a horizontal profile view of the articulated vehicle shown in FIG. 1.

Referring now to FIGS. 1 and 2 there is shown an articulated vehicle utilized in the construction equipment industry and commonly referred to as a wheeled scraper. The wheel scraper comprises a draft or tractive unit 11 mechanically joined to a trailer unit 12 (a portion of which is illustrated) by means of a coupling hitch connection 20 and has a plurality of flexible control lines 13, such as hydraulic hoses, interconnecting operator-actuated controls positioned on the draft unit 11 with actuators carried on the trailer unit 12 to control various functions on the trailer unit.

The trailer unit 11 includes a scraper bowl (not shown) supported at its rear end by a pair of wheels and at its front end by a draft frame 14, commonly referred to as a gooseneck. The draft frame 14 has a pair of rearwardly extending legs 15 pivotally connected to vertical side walls of the scraper bowl by a transverse pivot axis. A pair of hydraulic jacks 16 (one of which is shown in FIG. 1) interconnect the draft frame 14 with the front or leading portion of the scraper bowl. The jacks 16 are expanded or contracted to control the depth of cut the scraper bowl will take of material during loading operation. In operation, the actuation of jacks 16 to effect movement of the scraper bowl, is effected by the machine operator actuating controls carried on the draft unit 11 which are operatively coupled to the jacks by one or more of the plurality of control lines 13 interconnecting the draft and trailer units.

Figure 3:
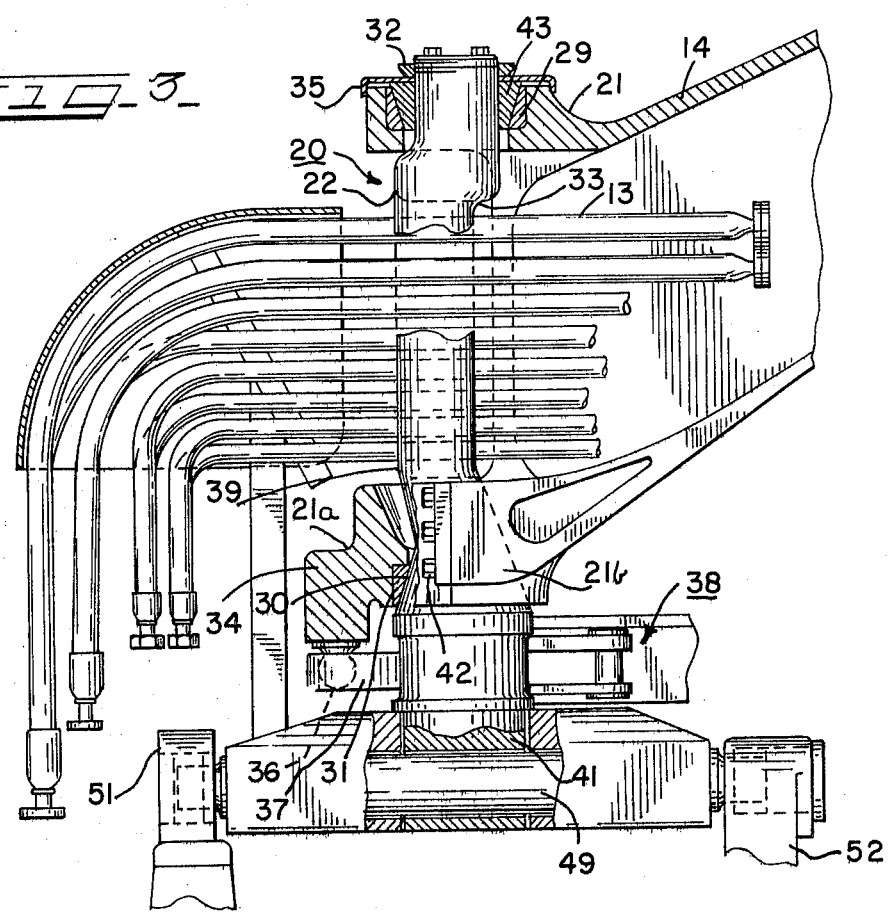
FIG. 3 is an enlarged view of the coupling of the articulated vehicle units to better illustrate the features of the invention.

The coupling hitch 20, which mechanically joins the two units and is best shown in FIG. 3, includes a pedestal housing 21 connected to the draft frame 14, an upper pedestal bearing 29, a lower pedestal bushing 31. A skirt 35 and a securing plate 32 are secured to the upper portion of a vertical hitch or coupling shaft 22, which is carried by the draft unit 11, to prevent dirt or other debris from entering into the bearing surfaces and to prevent axial separation of the pedestal housing 21 from the vertical coupling shaft 22. Projecting from the forward end of the pedestal housing 21 is a depending torque arm 34 which supports a pair of ball pins 36 (one of which is shown) and links 37 of a steering mechanism 38 for turning the draft and trailer units with respect to each other about the coupling hitch 20 in a manner well known in the art.

The pedestal housing 21 joins with the vertical hitching shaft 22 to form the coupling hitch 20 which allows the draft or tractive unit 11 of the vehicle to be angled horizontally relative to the trailer unit 12. The vertical hitch shaft 22 has an upstanding portion 39 and a hollow horizontal base portion 41. The upstanding portion 39 includes an integrally formed key to engage a key way formed in an axially movable bushing 43 for preventing rotation of the bushing 43 relative to the upstanding portion 39. The bushing 43 is, therefore, free to rotate relative to the upper pedestal bushing 29 carried by the pedestal housing 21. A tapered journal surface 30 is integrally formed on the upstanding portion 39 for rotatable engagement with the lower pedestal bushing 31.

The vertical hitch shaft 22 is formed with an elongated aperture 33 extending substantially parallel to the vertical axis thereof through which the control lines 13 pass interconnecting the draft and the trailer units, 11 and 12 respectively. The width of the aperture 33 is sufficient such that the control lines 13 may be bent to either side during pivoting of the draft unit 11 relative to the trailer unit 12 through angles of 90° to either side about the vertical axis of the coupling hitch without any damaging effect on the control lines 13 caused by contacting the sides of the aperture 33. The length of the aperture 33 is preferably sufficient to provide for passage of all the plurality of control lines 13.

In order to compensate for the loss of structural strength in the vertical hitch shaft 22 due to the aperture 33 formed therein, it is preferable that the lower portion of the coupling hitch, to which the links 37 of the steering mechanism 38 are attached, and which houses the lower hitch bore, be split for assembly. Therefore, the lower pedestal bushing 31 is split into two parts. The lower portion of pedestal housing 21 is formed with a lower split portion 21(a) which is secured to a lower portion 21(b) by suitable means such as cap screws 42 to connect the steering mechanism 38 and secure the lower pedestal bushing 31 into engagement with the bushing surface 30 of the upstanding portion 39 of the vertical coupling shaft 22.

The hollow horizontal base portion 41 of the vertical coupling shaft 22 includes suitable bearings or bushings for engaging a horizontal hitch pin 49. The horizontal hitch pin 49 functions to allow the draft and trailer units, 11 and 12 respectively, of the articulated vehicle to tilt relative to each other about a horizontal axis of the hitch pin 49 to keep all of the vehicle wheels in ground contact when travelling over uneven surfaces to prevent loss of tractive effort. A support block 51 and a rear pin support 52 carried by a frame portion of the draft unit 11 secure the hitch pin 49 to the draft unit 11 to permit relative tilt between the two units. For further details concerning the construction of such a suitable horizontal hitch pin assembly reference is had to the inventor's prior U.S. Letters Pat. No. 2,837,349, the disclosure of which is herein incorporated by reference.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. In a mounting for an articulated vehicle wherein a draft unit is structurally connected to a trailer unit by means of a vertical hitch shaft carried by one of the units and a complementary shaft-receiving bearing surface carried by the other unit permitting the interconnected units to be angled relative to each other, and the draft and trailer units are functionally interconnected by means of flexible control lines which couple controls on the draft unit to actuators on the trailer unit actuable in response to the draft unit controls, the improvement comprising an aperture formed in and extending transversely through the pivot axis of said vertical hitch shaft with said flexible control lines passing therethrough between said draft unit and said trailer unit.

2. The apparatus of claim 1 wherein said aperture comprises an elongated slot extending substantially parallel to the vertical axis of said vertical hitch.

3. The apparatus of claim 2 wherein said flexible control lines pass through said elongated slot formed in said vertical hitch and through a gooseneck portion of said trailer unit.

4. The apparatus of claim 2 wherein said elongated slot extends a width sufficient to permit substantially 90° angulation between units of said articulated vehicle without effecting the functional interconnection of said flexible control lines extending between said units.

5. In a mounting for an articulated vehicle wherein a draft unit is structurally connected to a trailer unit by means of a vertical hitch shaft carried by said draft unit and a complementary shaft-receiving bearing surface carried by a trailer unit permitting the interconnected units to be angled relative to each other, and the draft and trailer units are functionally interconnected by means of flexible control lines which couple controls on the draft unit to actuators on the trailer unit actuable in response to the draft unit controls, the improvement comprising an aperture formed in said vertical hitch shaft with said flexible control lines passing therethrough between said draft unit and said trailer unit, and said complementary shaft-receiving bearing surface being operatively connected to said vertical hitch shaft at positions above and below said aperture formed therein.

6. The apparatus of claim 5 wherein a lower portion of said complementary shaft-receiving bearing surface carried by said trailer unit is split for ease of assembly.

* * * * *